United States Patent
Chang et al.

(10) Patent No.: US 10,542,423 B1
(45) Date of Patent: Jan. 21, 2020

(54) CONTEXT-BASED PRESENTATION OF INFORMATION

(71) Applicant: Wells Fargo Bank, N.A., San Francisco, CA (US)

(72) Inventors: Michael Chang, Millbrae, CA (US); Brian M. Pearce, Pleasanton, CA (US); Suzanne M. Fisi, Clayton, CA (US); Daniel Sanford, Charlotte, NC (US); John Chuprevich, Davidson, NC (US); Miranda C. Hill, Seattle, WA (US); Traci Nguyen, San Francisco, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 35 days.

(21) Appl. No.: 15/389,070

(22) Filed: Dec. 22, 2016

(51) Int. Cl.
*H04W 12/02* (2009.01)
*H04W 4/02* (2018.01)

(52) U.S. Cl.
CPC ........... *H04W 12/02* (2013.01); *H04W 4/023* (2013.01)

(58) Field of Classification Search
CPC ................................ H04W 4/02; H04W 12/02
USPC ......................................................... 455/411
See application file for complete search history.

(56) References Cited

U.S. PATENT DOCUMENTS

| | | | |
|---|---|---|---|
| 7,552,467 B2 | 6/2009 | Lindsay | |
| 7,774,851 B2 | 8/2010 | Singh et al. | |
| 7,913,167 B2 | 3/2011 | Cottrille | |
| 8,230,481 B2 | 7/2012 | Singh et al. | |
| 8,868,905 B2 | 10/2014 | Davis et al. | |
| 8,892,872 B2 | 11/2014 | Davis | |
| 8,935,807 B2 | 1/2015 | Sinha et al. | |
| 8,973,149 B2 | 3/2015 | Buck | |
| 9,104,886 B1 | 8/2015 | Dolbakian et al. | |
| 9,135,465 B2 | 9/2015 | Cheng et al. | |
| 9,208,753 B2 | 12/2015 | Chan et al. | |
| 9,258,123 B2 | 2/2016 | Griffin et al. | |
| 9,264,850 B1* | 2/2016 | Lee | H04W 4/023 |
| 10,158,645 B1* | 12/2018 | Kenthapadi | G06N 20/00 |
| 2010/0205667 A1 | 8/2010 | Anderson et al. | |
| 2011/0072355 A1 | 3/2011 | Carter et al. | |

(Continued)

OTHER PUBLICATIONS

Berger et al., "Using Symbiotic Displays to View Sensitive Information in Public," IBM Research Division, http://domino.research.ibm.com/library/cyberdig.nsf/papers/378D63A0ACAB36A385256ED8006E6A96/$File/rc23274.pdf, Jul. 19, 2004, 11 pages.

(Continued)

*Primary Examiner* — Charles N Appiah
*Assistant Examiner* — Nicole M Louis-Fils
(74) *Attorney, Agent, or Firm* — Marchant & Gould P.C.

(57) ABSTRACT

Presenting information on a computing device based on context is disclosed. A non-limiting example is a computing device or method for presenting information. The method determines contextual information associated with the computing device. The contextual information includes proximity information identifying electronic devices in proximity to the computing device The method also comprises receiving information to present to a user of the computing device. The method also includes formatting the received information based on the determined contextual information and presenting the formatted information.

6 Claims, 14 Drawing Sheets

(56) References Cited

U.S. PATENT DOCUMENTS

| | | | |
|---|---|---|---|
| 2013/0169434 A1* | 7/2013 | McCown | G08B 21/00 |
| | | | 340/540 |
| 2014/0189784 A1* | 7/2014 | Marino | G06F 21/60 |
| | | | 726/1 |
| 2015/0062158 A1 | 3/2015 | Hildreth et al. | |
| 2015/0130811 A1 | 5/2015 | Ellis et al. | |
| 2015/0135067 A1 | 5/2015 | Ellis et al. | |
| 2015/0312404 A1 | 10/2015 | Abramson et al. | |
| 2016/0034133 A1 | 2/2016 | Wilson et al. | |
| 2016/0057090 A1* | 2/2016 | Faaborg | H04W 4/21 |
| | | | 709/206 |
| 2016/0070344 A1 | 3/2016 | Gohl | |
| 2016/0162900 A1 | 6/2016 | Dutt et al. | |
| 2016/0188902 A1* | 6/2016 | Jin | G06F 21/6245 |
| | | | 726/28 |
| 2017/0097996 A1* | 4/2017 | Gullett | G06F 17/30864 |
| 2017/0099378 A1* | 4/2017 | Mamdani | H04M 1/72547 |
| 2017/0255786 A1* | 9/2017 | Krishnamurthi | G06F 21/604 |

OTHER PUBLICATIONS

Zhou, "Enhancing Mobile Content Privacy With Proxemics Aware Notifications and Protection," Dalhousie University, https://dalspace.library.dal.ca/bitstream/handle/10222/64646/Zhou-Huiyuan-MCSc-CSCI-November-2015.pdf?sequence=1&isAllowed=y, Nov. 2015, 180 pages.

Mitchell et al., "Cashtags: Prevent Leaking Sensitive Information through Screen Display," Department of Computer Science, Florida State University, http://www.cs.fsu.edu/files/reports/TR-141209.pdf . Publication date estimated via Wayback Machine: http://web.archive.org/web/*/http://www.cs.fsu.edu/files/reportsfTR-141209.pdf, Jun. 23, 2016, 15 pages.

* cited by examiner

CONTEXT-BASED PRESENTATION OF INFORMATION

BACKGROUND

Computing devices are ubiquitous. For example, people often carry smartphones with them at nearly all times and locations. Modern smartphones provide many of the capabilities of a traditional desktop or laptop computing device. People typically use applications running on smartphones for many different purposes, such as for communication, entertainment, shopping, education, and to manage personal or professional affairs. These applications may expose private or confidential information in such a way that the information can be perceived by others in proximity to the user of the computing device.

SUMMARY

Embodiments of the disclosure are generally related to presenting information on a computing device based on context. In a non-limiting example, information is presented based on determining a privacy context for the computing device. As an example, the privacy context can be based on proximity to other devices. Based on the privacy context, sensitive information may be presented using qualitative indicators.

In a first aspect, a method of presenting information implemented on a computing device comprises determining contextual information associated with the computing device. The contextual information includes information identifying electronic devices in proximity to the computing device. The method further comprises determining a privacy context of the computing device based on the contextual information. The method also comprises receiving information to present to a user of the computing device. The method also includes formatting the received information based on the determined privacy context and presenting the formatted information.

In another aspect, a computing device comprising a processing unit, a radio frequency antenna, and a system memory is provided. The system memory includes instructions which, when executed by the processing unit, cause the computing device to determine contextual information associated with the computing device. The contextual information includes proximity information identifying electronic devices in proximity to the computing device. The memory also includes instructions to determine a privacy context of the computing device based on the contextual information, receive information to present to a user of the computing device, format the received information based on the privacy context, and present the formatted information.

In yet another aspect, a computing device comprising a processing unit, a radio frequency antenna, a location-determining device, a sound-sensing device, and an optical-sensing device is provided. The system memory includes instructions which, when executed by the processing unit, cause the computing device to capture contextual information using the radio frequency antenna by monitoring radio frequency communication signals to identify proximate devices and capture contextual information using the location-determining device by determining a location of the computing device. The instructions also cause the computing device to capture contextual information using at least one of the sound-sensing device and the optical-sensing device. The instructions further cause the computing device to determine a privacy context using contextual information captured using the radio frequency antenna, the location-determining device, and at least one of the sound-sensing device and the optical-sensing device. The instructions also cause the computing device to receive information from a server computer to present to a user of the computing device and identify sensitive information within the received information. The instructions further cause the computing device to generate a qualitative indicator for the sensitive information and format the received information based on the privacy context, including formatting the sensitive information using the generated qualitative indicator. The instructions also cause the computing device to generate a user interface to present the formatted information. The user interface includes a user-actuatable show control that, when actuated, causes the user interface to display the sensitive information.

The details of one or more techniques are set forth in the accompanying drawings and the description below. Other features, objects, and advantages of these techniques will be apparent from the description, drawings, and claims.

DETAILED DESCRIPTION

Figure 1:
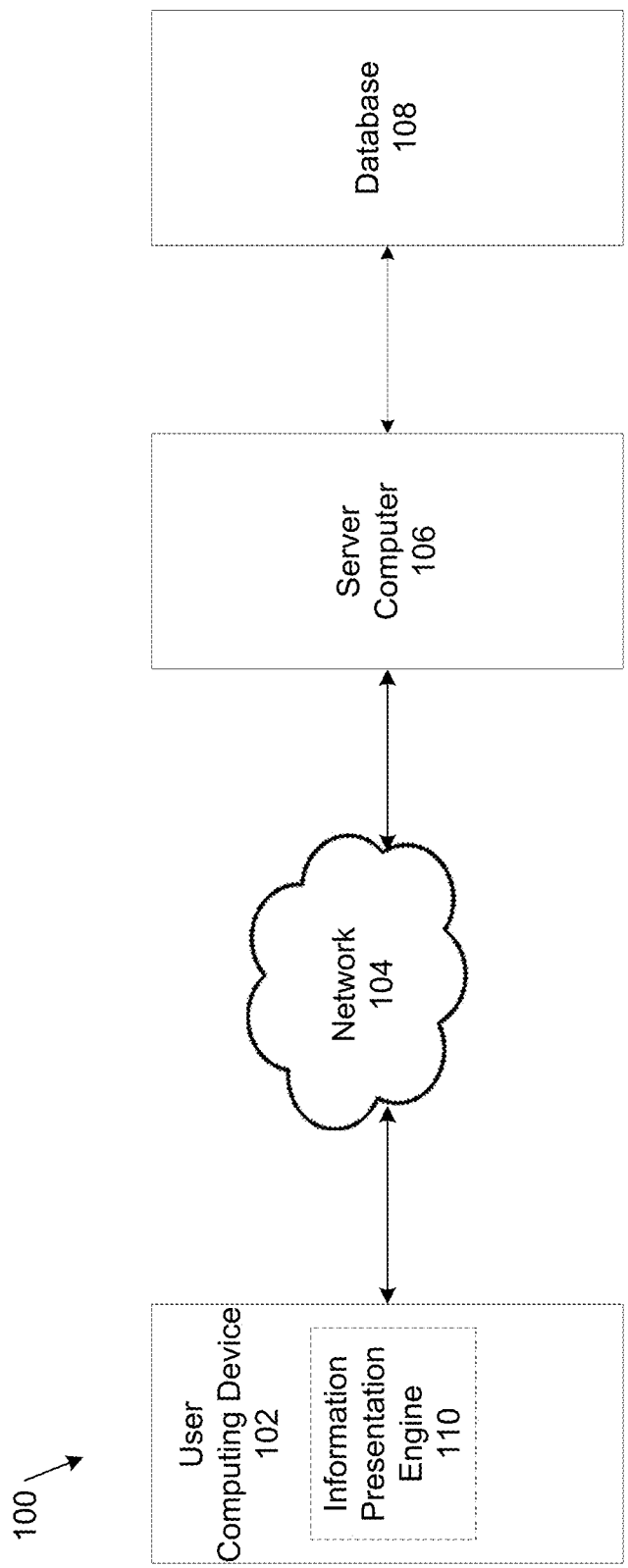
FIG. 1 shows an example system that presents information based on context.

The present disclosure is directed to systems and methods that present information to a user based on a context associated with a computing device. The context may be determined based on contextual information captured by sensors or other components of the computing device. The contextual information may be used to determine whether and how to present certain types of information to the user.

Additionally, the systems and methods may monitor the contextual information to detect changes to the context of the computing device and, when a change is detected, modify the presentation of the information. For example, if the computing device is a mobile computing device, the context of the device may change frequently as the device is brought in and out of different environments.

As an example, a privacy context can be determined and used to format sensitive information for presentation on the computing device. If the determined privacy context indicates that the computing device is likely to be in a public environment, sensitive information may be transformed into a qualitative indicator for presentation so that other people in proximity to the computing device so that the sensitive information is not revealed to other people who are near the computing device. If instead, the privacy context indicates that the computing device is in a private context, the sensitive information may be presented without transformation. Other types of context besides a privacy context such as location, available battery, and network strength can also be determined and used in presenting information.

The context can be determined based on many factors. As just one example, the context can be determined at least in part by identifying the presence of other electronic devices that are in proximity to the computing device. The other electronics devices can be identified by, for example, monitoring radio frequency communication signals with an antenna to identify communication patterns, networks (e.g., Wi-Fi networks), and devices that are available for pairing (e.g., via Bluetooth). If unknown devices or networks are detected, some embodiments determine that the computing device is in a public or non-private environment.

If only known devices (e.g., home or office Internet of Things (IOT) devices) are detected, some embodiments determine that the computing device is in a private environment. Additionally or alternatively, some devices determine privacy context based at least in part on the volume of radio frequency communication signals detected. Some embodiments determine context based on other factors too such as current location, location history, previous activities, and environmental sound or light conditions.

As another example, the presence of other people can be detected instead of or in addition to detecting other devices. The presence of people can be detected using various components of the computing device such as a sound-sensing device or optical-sensing device. The sound-sensing device can determine whether other people are present based on sounds sensed from the environment proximate the computing device. For example, the sounds can be processed using voice recognition technology. If multiple voices or unfamiliar voices are detected, some embodiments determine that other people are present.

The optical-sensing device can detect whether other people are likely to be present based on light-levels in the environment proximate the computing device. As another example, image processing technology can be used to process images captured by the optical-sensing device to recognizes faces, skin tones, human shapes, etc. to determine whether multiple unknown people are in the environment proximate the computing device. The optical-sensing device is not limited to the visible light spectrum and can include optical-sensing technologies that use infrared or thermal imaging. The optical-sensing device can also include multiple cameras, such as both a front-facing and rear-facing camera on a mobile computing device.

Multiple technological improvements related to presentation of information are provided herein. The technologies disclosed, for example, improve the interfaces used by computing devices present information to users. Non-limiting examples of the user interfaces disclosed herein enhance the security and privacy of sensitive information presented by a computing device. The technologies disclosed also provide for more efficient presentation of information based on context.

Furthermore, aspects disclosed herein present technological improvements in determining whether a computing device is located in a private or non-private environment. Embodiments disclosed herein provide methods and technologies for making a private/non-private environment determination using various specific sensing technologies and specially programmed computing devices. At least some of the aspects disclosed herein are dissimilar to the techniques used by a person to make a private/non-private environment determination and could not be performed as a mental process.

FIG. 1 shows an example system 100 that presents information based on context. In an example, the system may present sensitive information in a different manner based on context. The example system 100 includes a user computing device 102, a network 104, a server computer 106, and a database 108. Although FIG. 1 shows only the user computing device 102, additional user computing devices can also be used with the system 100.

Although alternatives are possible, the user computing device 102 is typically a mobile device such as a smart phone or tablet computer that can access the server computer 106 via a wireless connection through the network 104. The user computing device 102 can include one or more software applications that access the server computer 106 to, for example, retrieve information. For example, the software applications may use or incorporate an information presentation engine 110. The software applications can include functionality to present various types of sensitive information such as personal information, business information, financial information, or health information using the information presentation engine 110.

The example information presentation engine 110 can control, for example, the user interface and audio output of the user computing device 102 so that information is displayed in a desirable manner based on context. The information presentation engine 110 is described in more detail later herein.

The network 104 is an electronic communication network that facilitates communication between the user computing device 102 and the server computer 106. An electronic communication network includes a set of computing devices and links between the computing devices. The computing devices in the network use the links to enable communication among the computing devices in the network. The network 104 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 104 includes various types of links. For example, the network 104 can include wired and/or wireless links, including Bluetooth, ultra-wideband (UWB), 802.11, ZigBee, cellular, and other types of wireless links. Furthermore, in various embodiments, the network 104 is implemented at various scales. For example, the network 104 can be implemented as one or more local area networks (LANs), metropolitan area networks, subnets, wide area networks (such as the Internet), or can be implemented at another scale. Further, in some embodiments, the network 104 includes multiple networks, which may be of the same type or of multiple different types.

The example server computer 106 is a computer that provides services and information to the user computing device 102. Although alternatives are possible, the server computer 106 typically includes a software application for receiving and responding to information requests from computing devices such as the user computing device 102. The server computer 106 can retrieve information from the database 108 for inclusion in the response. In some embodiments, the requests are accompanied by contextual information from the requesting computing device or other sources. The server computer 106 can then evaluate the contextual information to determine how to format a response to the request. For example, if the contextual information indicates that the requesting computing device is in a private location, the response can include sensitive information. Alternatively, if the context information indicates that the requesting computing device is not in a private location, the response can omit sensitive information or convert sensitive information to a qualitative format. Although FIG. 1 shows only the server computer 106, additional server computers can also be used with the system 100.

The example database 108 is an electronic database that can be accessed from the server computer 106 or other server computers that are not shown in FIG. 1. The database 108 can store information that the server computer 106 can access and include in responses to requests from the user computing device 102. The database 108 can also store information that is used to evaluate contextual information provided by the user computing device 102 in a request for information. The database 108 can also store metadata relating to the stored information to, for example, identify sensitive information. The database 108 can be, but is not necessarily, a relational database.

Figure 2:
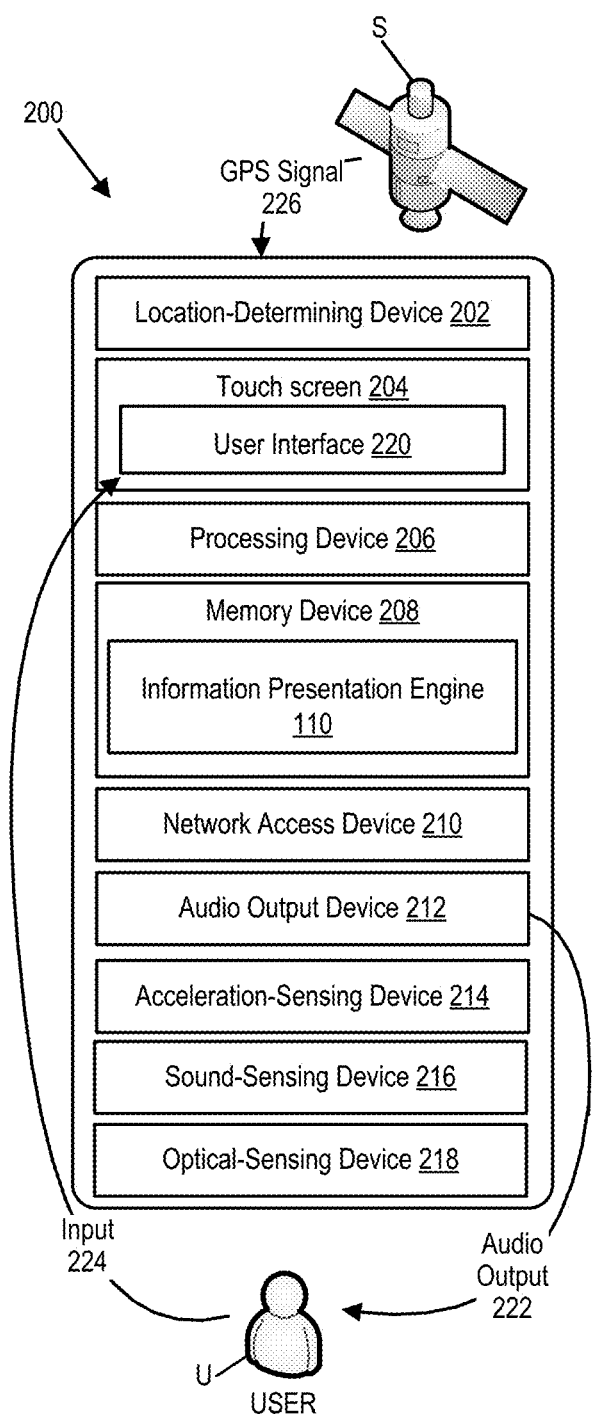
FIG. 2 shows an embodiment of a user computing device of the system of FIG. 1.

FIG. 2 is a schematic illustration of an embodiment 200 of a user computing device such as the user computing device 102 shown in FIG. 1. FIG. 2 also shows a user U and a satellite S.

The user computing device 200 operates to present information to a user based on context. The user computing device 200 can present information from various sources, including local data stores or remote data stores such as the database 108. The user computing device 200 can determine context for the user computing device 200 based on various sources of contextual information.

In some embodiments, the user computing device 200 is a mobile computing device, smartphone, tablet, watch, wearable device, laptop computer, handheld entertainment device, or any other type of device capable of presenting information. Other examples of the user computing device 200 include a desktop computer, television, gaming console, set-top box, network appliance, blue-ray or DVD player, media player, stereo, or radio.

In at least some embodiments, the user computing device 200 includes a location-determining device 202, a touch screen 204, a processing device 206, a memory device 208, a network access device 210, an audio output device 212, an acceleration-sensing device 214, a sound-sensing device 216, and an optical-sensing device 218. Other embodiments may include additional, different, or fewer components. For example, some embodiments include one or more buttons, keypads, mice, or other types of user input devices.

The location-determining device 202 is a device that determines the location of the user computing device 200. In some embodiments, the location-determining device 202 uses one or more of the following technologies: Global Positioning System (GPS) technology which determines locations based on GPS signals 226 received from satellites such as the satellite S, cellular triangulation technology, network-based location identification technology, Wi-Fi positioning systems technology, and combinations thereof.

The touch screen 204 operates to receive an input 224 from a selector (e.g., a finger, stylus, etc.) controlled by the user U. In some embodiments, the touch screen 204 operates as both a display device and a user input device. In some embodiments, the touch screen 204 detects inputs based on one or both of touches and near-touches. In some embodiments, the touch screen 204 displays a user interface 220 for interacting with the user computing device 200. Some embodiments do not include a touch screen 204 and may instead include a display device and one or more separate user input devices.

In some embodiments, the processing device 206 comprises one or more central processing units (CPU). In other embodiments, the processing device 206 additionally or alternatively includes one or more digital signal processors, field-programmable gate arrays, or other electronic circuits.

The memory device 208 operates to store data and instructions. In some embodiments, the memory device 208 stores instructions for a media-playback engine 166 that includes a repetitive-motion activity enhancement engine 168. In some embodiments, the media-playback engine 166 operates to playback media content and the repetitive-motion activity enhancement engine 168 operates to select media content for playback to enhance a repetitive-motion activity.

The memory device 208 typically includes at least some form of computer-readable media. Computer readable media includes any available media that can be accessed by the user computing device 200. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store information and that can be accessed by the user computing device 200. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The network access device 210 operates to communicate with other computing devices over one or more networks, such as the network 104. Examples of the network access device include wired network interfaces and wireless network interfaces. Wireless network interfaces include infrared, BLUETOOTH® wireless technology, 802.11a/b/g/n/ac, and cellular or other radio frequency interfaces in at least some possible embodiments.

The audio output device 212 operates to generate audio output. Examples of the audio output device 212 include a speaker, an audio output jack, and a Bluetooth transmitter. Other embodiments are possible too. For example, the audio output device 212 may transmit a signal through the audio output jack or Bluetooth transmitter that can be used to reproduce an audio signal by a connected or paired device such as headphones or a speaker.

The acceleration-sensing device 214 operates to acquire acceleration information associated with the user computing device 200. The acceleration information can include an orientation of the user computing device 200 relative to a primary direction of gravitational acceleration (e.g., which side of the user computing device 200 is facing up). The acceleration information can also include information about the movement of the user computing device 102. In at least some embodiments, the acceleration-sensing device 214 includes one or more accelerometers or other orientation- or motion-detecting technologies.

The sound-sensing device 216 senses audio signals proximate the user computing device 200. In some embodiments, the sound-sensing device 216 comprises one or more microphones. For example, the sound-sensing device 216 may capture a recording of sounds from proximate the user computing device 200. Additionally or alternatively, the sound-sensing device may determine various sound properties about the sounds proximate the user such as volume, dominant frequency or frequencies, etc. These sound properties may be used to make inferences about the environment proximate to the user computing device 200 such as whether the sensed sounds are likely to correspond to an indoor environment, an outdoor environment, a crowded environment, a private environment, etc.

The optical-sensing device 218 senses optical signals proximate the user computing device. In some embodiments, the optical-sensing device 218 comprises one or more light sensors or cameras. For example, the optical-sensing device 218 may capture images of the environment proximate the user computing device. The captured images can be processed to determine whether it is likely that other people will be able to view or hear information presented by the user computing device 200. Similarly, a light sensor can be used to determine various properties of the environment proximate the user computing device, such as the brightness and primary frequency (or color or warmth) of the light in the environment proximate the user computing device 200. These properties of the sensed light may then be used to infer whether the user computing device 200 is in an indoor environment, an outdoor environment, an office environment, a residential environment, etc.

Figure 3:
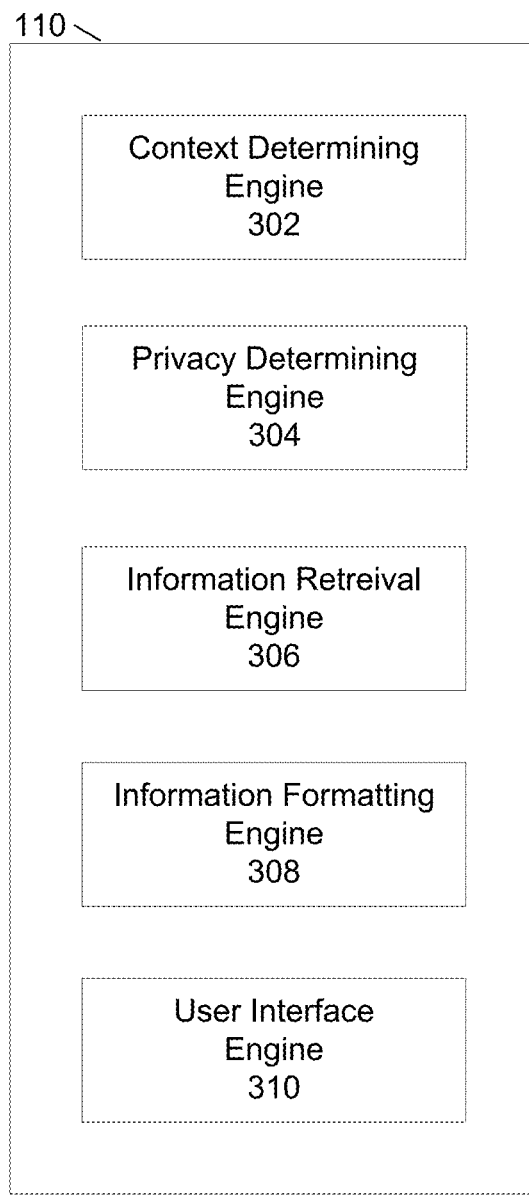
FIG. 3 shows a schematic block diagram of an example information presentation engine of the user computing device of FIG. 1.

FIG. 3 shows a schematic block diagram of an embodiment of the information presentation engine 110. As discussed previously, the information presentation engine 110 presents information to a user of the user computing device 102. For example, the information presentation engine 110 can determine contextual information about the user computing device 102 and determine an appropriate format for presentation of information to the user based on that contextual information. As an example, the information presentation engine 110 may omit, obscure, or obfuscate sensitive information if the contextual information indicates that the user computing device 102 is in a public or otherwise non-private location. As another example, the information presentation engine 110 may alter the presentation of information based on the network access strength at the location of the user computing device 102 or based on the power or remaining battery of the user computing device 102.

In the example shown in FIG. 3, the information presentation engine 110 includes a context determining engine 302, a privacy determining engine 304, an information retrieval engine 306, an information formatting engine 308, and a user interface engine 310. Some embodiments include different, fewer, or additional engines.

The context determining engine 302 determines contextual information for the user computing device 102. The contextual information can be determined from many sources. In some embodiments, the contextual information is determined by detecting devices that are proximate to the user computing device 102. For example, the presence of unknown other electronic or computing devices in proximity to the user computing device 102 may indicate that the user computing device 102 is not in a private location. Other sources of contextual information used by embodiments of the context determining engine 302 include location information such as may be provided by a location-determining device such as the location-determining device 202.

Another example of contextual information can be obtained from an acceleration-sensing device such as the acceleration-sensing device 214. For example, information from an acceleration-sensing device alone or in conjunction with information from a location-determining device can be used to determine whether the user computing device 102 is moving and whether the user computing device 102 is moving in a public environment (e.g., on a bus, train, or other form of public transportation).

Yet another example of determining context information uses a sound-sensing device and/or optical-sensing device to evaluate the environment around the user computing device. The presence of noises, voices (e.g., as identified using speech recognition software on audio samples captured by a sound-sensing device), lights, and faces (e.g., as identified using facial recognition software on images captured by a camera) can be indicative of whether the user computing device 102 is around other people and thus in a private or non-private environment.

The privacy determining engine 304 evaluates various information to determine whether the user computing device 102 is likely in a private environment. In some embodiments, the privacy determining engine 304 determines a privacy level for the user computing device. The privacy level can be a numeric value representing the level of privacy that is likely available to the device based on contextual information.

The information retrieval engine 306 retrieves information for presentation to a user of the user computing device 102. The information can be retrieved from many sources. Although alternatives are possible, the information is often retrieved from the server computer 106. In these embodiments, the information retrieval engine 306 sends a request for information to the server computer 106. Alternatively, the information retrieval engine 306 can retrieve information that is stored locally on the user computing device 102 such as in a local data store such as a database, file, or other form of local data store.

The information formatting engine 308 formats information for presentation to the user based on context as determined by the context determining engine 302 and/or the privacy level determined by the privacy determining engine 304. In some embodiments, the information formatting engine 308 modifies, obfuscates, and/or omits sensitive information from presentation to the user when a privacy level determined by the privacy determining engine 304 indicates that the current environment of the user computing device 102 is not private.

The term "sensitive information" and variants thereof as used herein refers to any information that a person may desire to keep private. Non-limiting examples of sensitive information include test results, medical/health information, genetic information, financial information, and job performance or compensation information. Sensitive information can be, but is not limited to, numeric (or quantitative) information.

In some embodiments, sensitive information is presented using a qualitative indicator rather than a numerical value in a non-private environment. Example qualitative indicators include a color (e.g., a green circle to indicate good or improvement and a red circle to indicate bad or decline) or an icon (e.g., a smiley face to indicate a value that meets a predetermined condition and a frowny face to indicate a value that does not meet a predetermined condition).

As another example of a qualitative indicator, the information formatting engine 308 can generate a graph that qualitatively indicates the sensitive information compared to an existing predetermined threshold value. For example, the graph could be a pie chart that is partially filled to indicate a balance in a bank account relative to a threshold such as a savings goal. However, it should be understood that the information formatting engine 308 is not limited to sensitive information that is financial in nature. Instead, information formatting engine 308 can be used to format other types of sensitive information too. For example, the information formatting engine 308 can be used to generate a qualitative indicator of medical or health information also.

Although the preceding examples of qualitative indicators relate to primarily visual qualitative indicators, some embodiments include non-visual qualitative indicators too. A non-limiting example of a non-visual qualitative indicator is a haptic response. For example, a haptic response can be generated to qualitatively indicate sensitive information (e.g., a duration or number of vibrations may indicate a particular value or that a particular threshold/condition has been met). In some embodiments, information to interpret the haptic response may be displayed instead of the sensitive information. A user can then feel the haptic response and interpret the haptic response using the visually presented information. Even if a bystander is able to view the information, the bystander will be unlikely to sense the haptic response and will thus not have access to the sensitive information.

In some aspects, the information formatting engine 308 may cause some or all sensitive information to be displayed using an augmented reality system when determined that the environment of the user computing device is not private. Non-limiting examples of augmented reality systems are described in U.S. Ser. No. 14/151,960, titled AUGMENTED REALITY VIRTUAL BANKER, filed on Jan. 10, 2014, the entire disclosure of which is hereby incorporated by reference.

The information formatting engine 308 can also be used to format information based on other types of context besides privacy context. The information formatting engine 308 will, in some embodiments, format information based on the network strength available to the user computing device 102 as determined by the context determining engine 302. For example, when the network is weak and data transmission is slow to the user computing device 102, the information formatting engine 308 may generate or request a simple text-based (e.g., one or more characters) that can qualitatively indicate the information. This text-based representation would require less data transmission than an icon or graphical indicator of the qualitative information. Furthermore, the information formatting engine 308 can format information in a non-visual manner too. As an example, the information formatting engine 308 can convert the information to an audio output.

The user interface engine 310 generates a user interface that is displayed on the user computing device 102. The user interface engine 310 can include information formatted by the information formatting engine 308 in the user interfaces it generates. In some examples, the user interface engine 310 includes user actuatable elements that can change the presentation of the information on the user interface. For example, the user interface engine 310 may include an element that when actuated will display a quantitative value for sensitive information that is currently being displayed qualitatively. As another example, the user interface engine 310 may display an element that when actuated causes audio output of sensitive information that is not currently being displayed on the user interface based on context.

Figure 4:
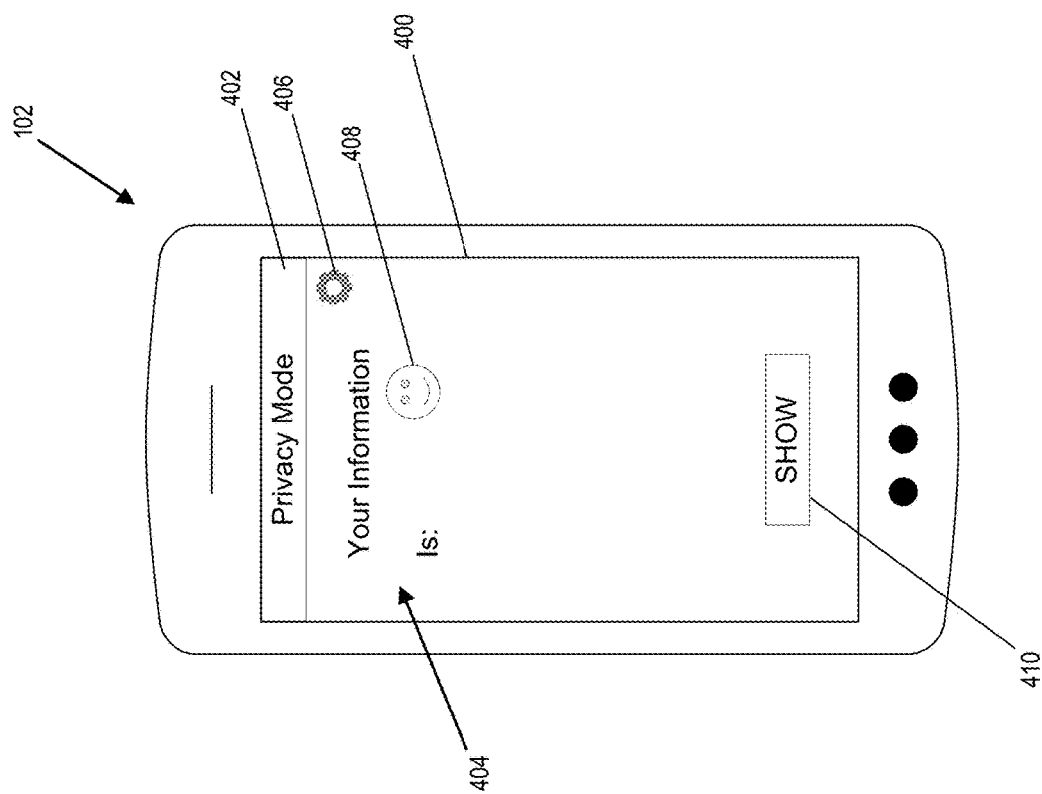
FIG. 4 shows an example user interface screen that is displayed by embodiments of the user computing device of the user computing device of FIG. 1.

Turning now to FIG. 4, an example user interface screen 400 is shown on an embodiment of the user computing device 102. In this example, the user interface screen 400 includes a privacy mode indicator 402, an information descriptor 404, a settings control 406, a qualitative indicator 408, and a show control 410.

The privacy mode indicator 402 is displayed as a banner across the top of the user interface screen 400 in this example. The privacy mode indicator 402 indicates that the user interface screen 400 has been generated to protect sensitive information. The privacy mode indicator 402 may be shown based on the privacy level determined by the privacy determining engine 304. In some embodiments, the privacy mode indicator 402 may include multiple banners or different types of indicators. Additionally, some embodiments, operate in a privacy mode without displaying a privacy mode indicator.

The information descriptor 404 is a descriptive element that describes the information that is being presented. In some embodiments, the information descriptor 404 is a textual description of the information that is being presented. In the example of FIG. 4, the information descriptor 404 includes the text: "your information is:". In other embodiments, the information descriptor can include more details about the information that is being displayed (e.g., "your account balance is:", "your test results:", "your performance review:"). Additionally, in some embodiments, the information descriptor 404 may be a graphical element that expressly describes the information that is being presented or otherwise suggests the nature of the information being presented.

The settings control 406 is a user actuatable element that when actuated presents various settings that a user may adjust to control the operation of the information presentation engine 110. In some embodiments, the settings control 406 includes a setting to disable the privacy mode determination that is performed by the privacy determining engine. In these embodiments, the user interface screen 400 would show the sensitive information regardless of the privacy determination of the privacy determining engine 304. The settings control 406 can also be used to specify thresholds that are usable for converting sensitive information to qualitative indicators.

The qualitative indicator 408 is an indicator of a qualitative value corresponding to sensitive information. In this example, the qualitative indicator 408 is shown as a smiley face. The qualitative indicator 408 may be generated in part by the information formatting engine 308. For example, the information formatting engine 308 can compare the sensitive information that is to be presented to a predetermined threshold and select a qualitative indicator based on that predetermined threshold.

As an example, if the sensitive information relates to a financial value, the qualitative indicator 408 may be generated based on the financial value exceeding a predetermined threshold or meeting a predetermined condition. The threshold and/or condition may be set by the user. Additionally, the threshold may be specified in a request included with the request for information generated by the information retrieval engine 306.

For example, the information retrieval engine 306 may generate a request based on a user wondering whether he or she can afford to purchase a new electronic device. The request may then include the price of the electronic device. In some embodiments, the information formatting engine 308 will then generate a qualitative indicator depending on whether the account balance in question exceeds the price or whether the price is less than a predefined percentage of the account balance (e.g., 10%, 25%, 50%, etc.). Although a smiley face is shown as the qualitative indicator 408 in this example, many other qualitative indicators can be used. In some examples, the qualitative indicator 408 includes more than two states. For example, the qualitative indicator 408 can be a graphical representation of a potential purchase item that is shown at a size that corresponds to its affordability for the user based on the user's account balance.

As mentioned previously, the information presentation engine 110 is not limited to presentation of financial information. The information presentation engine 110 may also present other types of sensitive information and use the qualitative indicator 408 to present a qualitative status of that other sensitive information also. For example, the qualitative indicator 408 can be used to indicate performance on an academic test. In many academic tests (e.g., aptitude tests for college admission), a test taker received a numerical score. The test taker may wish to keep the numerical score confidential and may consider the numerical score to be sensitive information. The qualitative indicator 408 can show a qualitative status of a test score without revealing the actual score. The qualitative indicator 408 could include a first indicating state based on achieving a highest threshold, a second indicating state based on achieving a second lower threshold and a third indicating state based on failing to achieve either of those thresholds. The qualitative indicator 408 and the information presentation engine 110 can be used to display many other types of information too.

The show control 410 is a user actuatable element that is displayed on the user interface screen 400. In some embodiments, the show control 410, when actuated, causes the user interface to display the sensitive information. For example, the user interface screen may be updated to replace the qualitative indicator 408 with the sensitive information. Alternatively, the show control 410 may display the sensitive information at another location rather than replacing the qualitative indicator 408. For example, the show control 410 itself may be replaced with the sensitive information. This embodiment may be particularly useful in situations where another person may be able to observe the screen of the user computing device 102 because the user's hand is likely to be near the show control 410 and can occlude viewing of the sensitive information by others.

Although the example shown in FIG. 4 includes a qualitative indicator 408, other examples may include multiple qualitative indicators or no qualitative indicators. For example, multiple qualitative indicators may be included when multiple discrete elements of sensitive information are being displayed on the user interface screen 400. Alternatively, the user interface screen 400 can be generated based on sensitive information that is either not amenable to display with a qualitative indicator or that is determined to be too sensitive to display in the current context (even using a qualitative indicator). In this situation, the user interface screen 400 may hide the sensitive information so that it is not shown qualitatively or otherwise. In some of these embodiments, the user may still be able to cause the sensitive information to be shown by actuating the show control 410. When the sensitive information is hidden, the user interface screen may include a blurred region, an image of a lock, or another visual indicator that sensitive information is being hidden.

Although the user interface screen 400 includes the show control 410, some embodiments do not include a show control. Instead, certain information may simply not be accessible in certain contexts. As another alternative, the show control 410 may be replaced with a playback control that triggers an audio playback of the sensitive information. The playback control may be useful when the user computing device is being used with headphones or another type of private audio channel.

Figure 5:
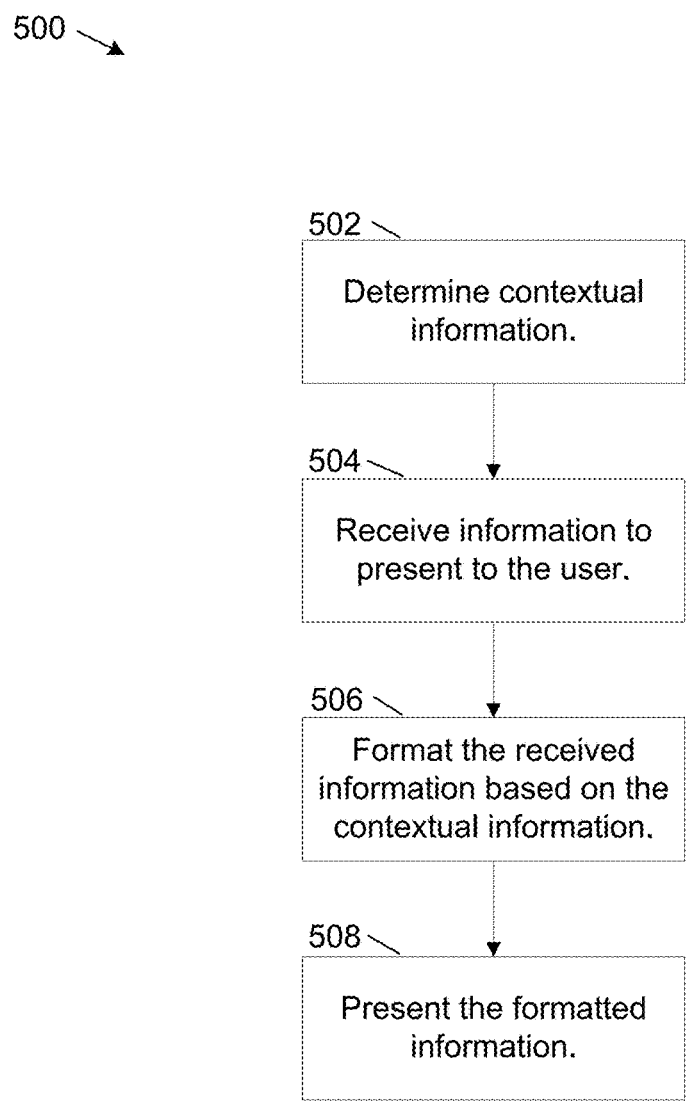
FIG. 5 shows an example method of presenting information that is performed by some embodiments of the information presentation engine of the user computing device of FIG. 1.

Turning now to FIG. 5, an example method 500 of presenting information that is performed by some embodiments of the information presentation engine 110 is provided.

At operation 502, contextual information is determined. The contextual information may be determined by the context determining engine 302 and may include various factors about the context of the user computing device 102. These factors include but are not limited to the number and identity, if available, of proximate devices such as other user computing devices and internet of things (IOT) devices (e.g., connected speakers, connected refrigerators, connected kitchen appliances, etc.).

The contextual information can also include sounds or information about sounds recorded using a sound-sensing device of the user computing device 102 or images or light conditions recorded or determined using an optical-sensing device of the user computing device 102, or movement or orientation data captured by the user computing device 102. The contextual information may also include location data recorded by the user computing device and, in some embodiments, historical location data and historical usage data. As another example, the contextual information can include remaining battery percentage and network signal strength of the user computing device 102. Another example of contextual information is the available wireless networks and whether they are known or unknown to the user computing device 102.

At operation 504 information is received for presentation to the user. The information may be received in response to a request from the user or in response to the user staring an application on the user computing device. The information may be received from a source that is local to the user computing device such as a file or a data store or database. Alternatively, the user computing device 102 may receive the information from the server computer 106 in response to a request generated by the user computing device 102.

In some embodiments, the received information includes metadata about the received information that identifies attributes of the received information. For example, the metadata can identify portions of the received information that are sensitive or are otherwise suitable for alternative presentation to the user.

At operation 506, the received information is formatted based on the contextual information. In some embodiments, the received information is converted, at least in part, to qualitative indicators when the received information includes sensitive information. In other embodiments, the received information may be converted to an audio format or another format that is appropriate based on the contextual information.

At operation 508, the formatted information is presented. The formatted information may be presented on a user interface screen generated by the user interface engine 310. Presentation of the formatted information may also include generation of one or more user actuatable controls to reveal or otherwise present portions of the formatted information.

In addition to formatting and presenting information based on context, some embodiments receive user input in a manner that is determined based on context. For example, different types of authentication inputs may be elicited based on the determined context. If it is determined that the user is in a private context, a user interface for entering a password, pin, or swipe pattern may be presented. If, however, it is determined that the user is not in a private context, a prompt to provide one or more of a gesture, haptic, or other type of input (e.g., a facial recognition using a camera) may be provided instead. In this manner, a bystander is less likely to observe and capture the authentication information in a manner that can be reused.

Figure 6:
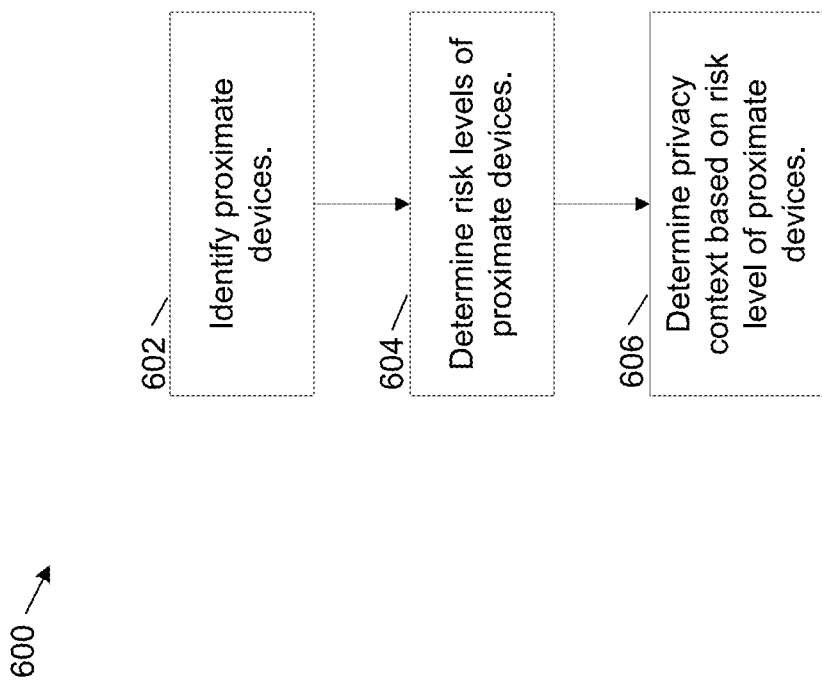
FIG. 6 shows illustrates an example method of determining contextual information based on proximate devices performed by embodiments of the information presentation engine of the user computing device of FIG. 1.

FIG. 6 illustrates an example method 600 of determining contextual information based on proximate devices. The method 600 may be performed by the context determining engine 302.

At operation 602, proximate devices are identified. For example, proximate devices may be identified by scanning for Bluetooth or Wi-Fi signals at the user computing device 102. As another example, proximate devices may be identified based upon a determined location of the user computing device 102 and information about locations of other computing devices that is stored on a network device such as server computer 106. The information about locations of other computing devices may also be provided by a separate computer or service that is available via the network. The information about the location of the user computing device 102 may be a geographical location such as coordinates determined using a GPS device or may be a network location such as an identifier of a wireless network to which the device is connected. In some embodiments, distances to some or all of the proximate devices are determined.

Figure 9:
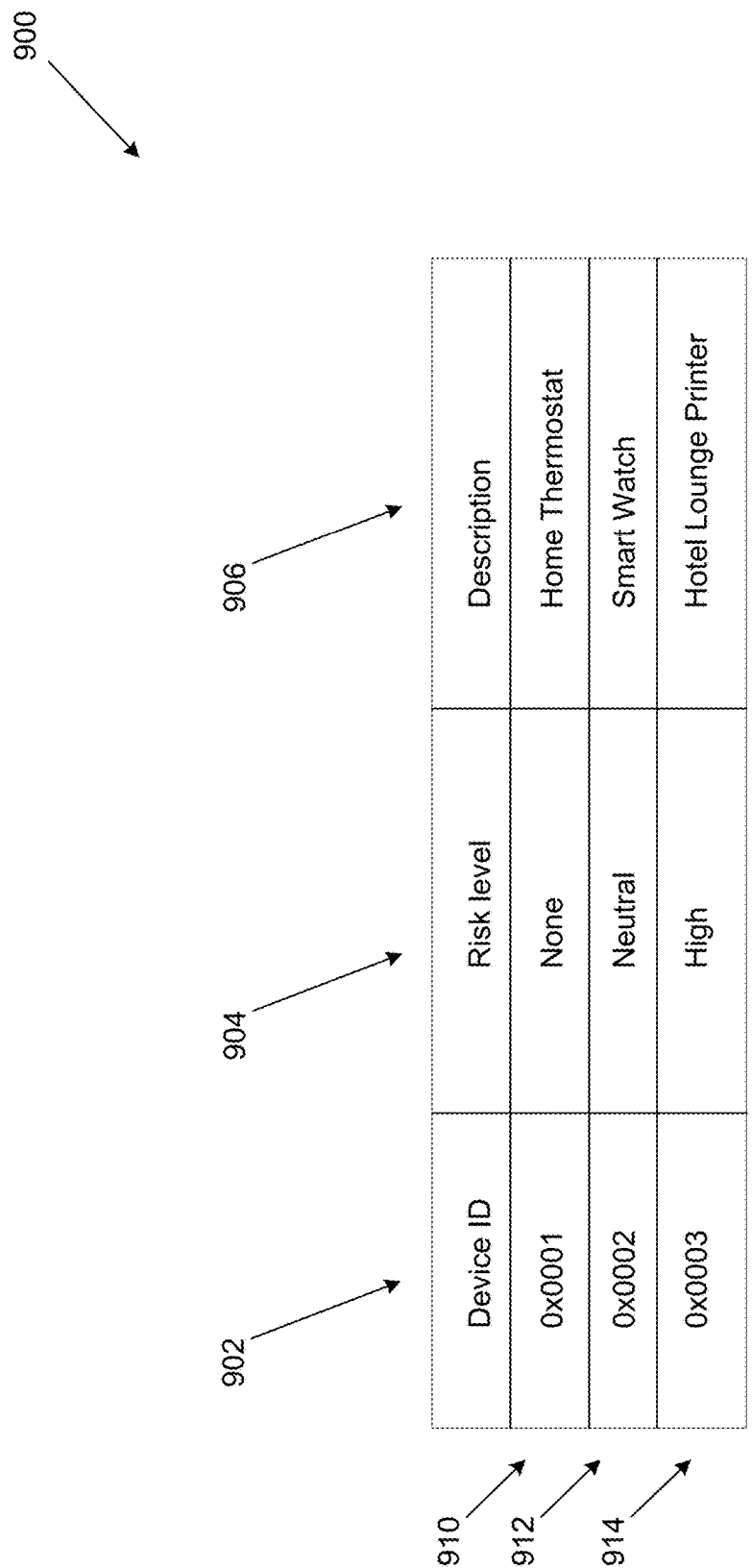
FIG. 9 shows an example table for storing known devices that is used by embodiments of the information presentation engine of the user computing device of FIG. 1.

At operation 604 a risk level is determined for some or all of the identified proximate devices. In some embodiments, to determine the risk level of the proximate devices, the devices identified in 602 are compared to a table of devices that are known to the user computing device 102 (or a user who is associated with the user computing device 102). For example, a unique identifier of the identified device may be used to check for and, when available, retrieve a record in the table that is associated with the identified device. The table of known devices may be stored locally on the user computing device 102 or may be stored elsewhere such as in the database 108. An example of a table of known devices is shown in FIG. 9 and will be discussed further with respect to that figure.

In some embodiments, the record includes a data value corresponding to risk level (e.g., a numeric value, a binary value, etc.). Some embodiments do not include a data value corresponding to risk level and instead only records associated with devices that are considered low risk are stored in the table; in these embodiments the presence of a matching record in the table of known devices is used to determine that the device does not present a risk.

Additionally, in some embodiments, any proximate devices that are not found in the table may be assigned a default risk level. This default risk level may be high to reflect the risk of an unknown device. The default risk level may also be determined based on the type of device or manufacturer of the device, which in some cases is determined based on the identifier of the device. When a distance to the proximate device is determined, the risk level may be scaled based on the distance so that the risk level is inversely proportional to distance (e.g., a nearby unknown device has a higher risk level than an unknown device that is further away).

At operation 606, a privacy context is determined based on the risk levels of the proximate devices. In various embodiments, various techniques are used to determine a privacy context based on the risk levels of the proximate devices. For example, a privacy context may be determined by comparing a combined risk level calculated across the identified proximate devices.

In some embodiments, the combined risk level is determined to be the maximum risk level of all of the identified proximate devices. In other embodiments, the combined risk level is determined by summing the risk levels of all of the identified proximate devices. In the manner, the presence of many devices, even when of low risk individually may indicate a privacy risk. The combined risk level can be evaluated against one or more conditions to determine the privacy context. An example condition is a predetermined threshold risk level. In this example, if the combined risk level exceeds the predetermined threshold risk level, the privacy context is determined to be not private. In some embodiments, the risk level associated with an unknown device and the predetermined risk level are selected so that even a single unknown device will exceed the predetermined threshold risk level. In some embodiments, certain devices (or types of devices) are determined to be inherently risky and the detection of even one of these devices may cause a particular privacy context to be determined.

Although the examples above describe privacy context in a binary manner (i.e., private or not private), other embodiments are possible too. For example, the privacy context may have three or more values or may even be a numeric value. In these embodiments, appropriate conditions or calculations are used to determine the privacy context. In embodiments that include a non-binary privacy context, certain types of sensitive information may be displayed in somewhat non-private context (e.g., based on one or both of user and information-provider preferences).

Figure 7:
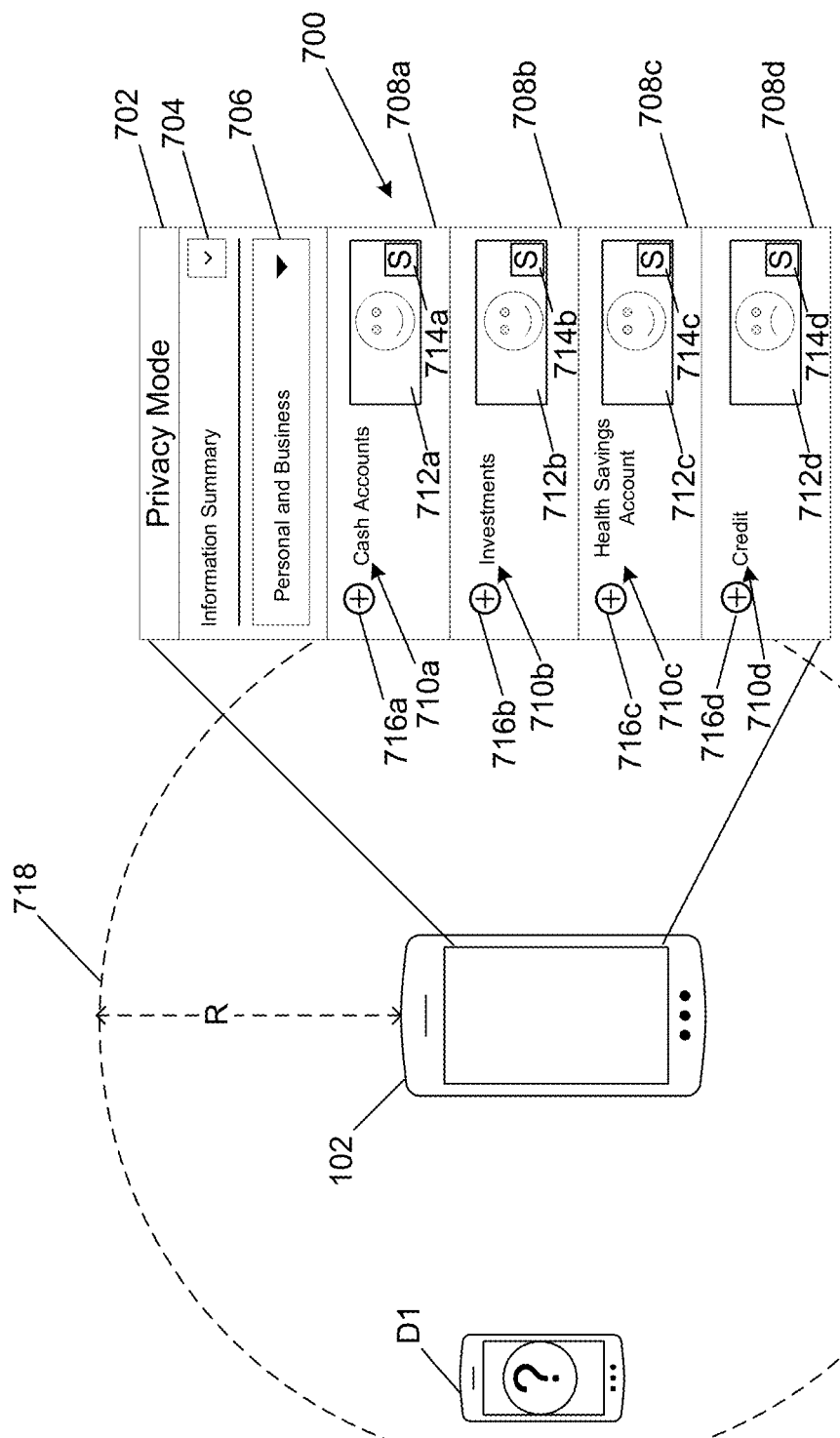
FIG. 7 shows an example of the user computing device of FIG. 1 when operating in a privacy mode based on proximity to an unknown device.

Turning now to FIG. 7, an example of the user computing device 102 displaying a user interface screen 700 when used in proximity to an unknown device D1 is shown. In this example, the user computing device 102 has looked for proximate devices (e.g., in accord with the method 600 illustrated in FIG. 6) and has determined that device D1, which is not known to the user computing device 102, is within a predetermined radius of the user computing device 102. In this example, the predefined radius R defines a proximity threshold 718. Any device within the proximity threshold 718 is considered when determining a privacy context for the user computing device 102. Although the proximity threshold is defined as a circle in this example, other types of proximity thresholds can be used too. For example, the proximity threshold may be defined by geographic features around the location of the user computing device 102.

In this example, because an unknown device D1 is proximate to the user computing device 102, the user interface is operating in a privacy mode as indicated by the privacy mode indicator 702. In addition to the privacy mode indicator 702, the user interface screen 700 includes a function selector 704, a filter selector 706, and information panels 708a, 708b, 708c, and 708d. The information panel 708a includes an information identifier 710a, a qualitative indicator 712a, and a show control 714a, and an expand control 716a. The information panels 708b, 708c, and 708d include similar elements.

The information identifier 710a provides information about the information being displayed in the information panel 708a. The qualitative indicator 712a provides a qualitative indicator of the information. The qualitative indicator 712a is used when determined that the information is sensitive information that should not be displayed directly based on current contextual information. The show control 714a is a user actuatable element that when actuated will cause the information associated with the qualitative indicator 712a to be displayed (e.g., the qualitative indicator 712a may be replaced on the user interface screen 700 with the actual information). The expand control 716a is a user actuatable element that, when actuated, will cause the information panel 708a to be expanded to show more information about the content of the information panel 708a.

Figure 8:
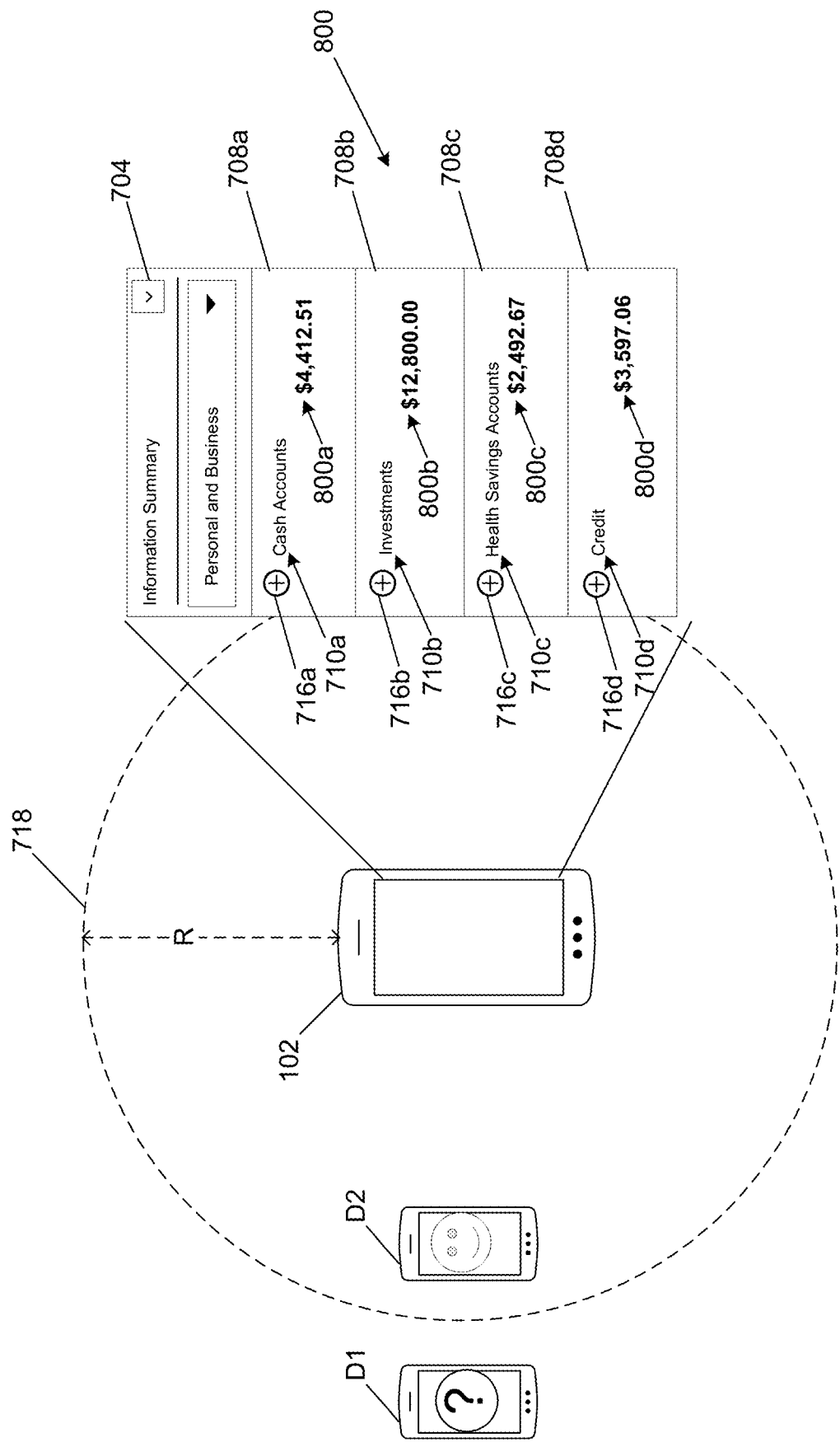
FIG. 8 shows an example of the user computing device of FIG. 1 when operating in a normal or non-privacy mode.

Turning now to FIG. 8, an example of the user computing device 102 displaying a user interface screen 800 when operating in a normal or non-privacy mode is shown (e.g., when determined based on contextual information that a privacy mode is not necessary). In this example, the user computing device 102 is proximate to a device D2 that is known and presents a low privacy risk. A device D1 is also shown in this figure but the device D1 is outside of the proximity threshold 718 and is not considered in determining the privacy context of the user computing device 102. Here, the user interface screen 800 is similar to the user interface screen 700 described with respect to FIG. 7 except that the sensitive information is now shown in each of the information panels 708a, 708b, 708c, and 708d. For example, in the information panel 708a, sensitive information 800a is shown numerically. Because the information is shown numerically, the information panel 708a also omits the show controls that appeared in the user interface screen 700.

Turning now to FIG. 9, an example table 900 for storing known devices is shown. The table 900 may be stored locally on the user computing device 102 or may be stored on a computing device that is accessible via a network such as the database 108. In this example, the table 900 includes device identifier (ID) column 902, a risk level column 904, and description column 906. In some embodiments, the table 900 includes additional, different, or fewer columns. In this example, the table 900 is storing three example records 910, 912, and 914. Of course, the table 900 can store any number of records.

The device identifier column 902 is usable to store an identifier of a known device. Typically, the identifier uniquely identifies the known device. Some example identifiers include a media access control (MAC) address, an international mobile equipment identity (IMEI) number, an integrated circuit card identifier (ICC ID) associated with a subscriber identity module (SIM) card, or an international mobile subscriber identity (IMSI). Other types of identifiers may be used too.

The risk level column 904 is used to store a risk level associated with a known device. An example of the risk level is a numeric value or a value selected from a list. For example, in FIG. 9, the risk level is shown as having one of three values none, neutral, or high. In an embodiment, when a device with the risk level of none is proximate to the user computing device it is determined that the environment does not require privacy. For example, as shown in record 910, a home thermostat is assigned a risk level of none.

Alternatively, when a device with a risk level of neutral is proximate to user computing device 102, the user computing device will not consider it in its risk determination analysis. For example, as shown in record 912, a smart watch, which typically travels with the user of the user computing device 102, is assigned a neutral risk level and is not considered as being indicative of whether the user computing device 102 is an environment where privacy is available. When a device with a risk level of high is proximate to the user computing device 102, the user computing device 102 may determine that a privacy mode is required for presentation of sensitive information. For example, as shown in record 914, a hotel lounge printer may be indicative of a non-private environment.

Figure 10:
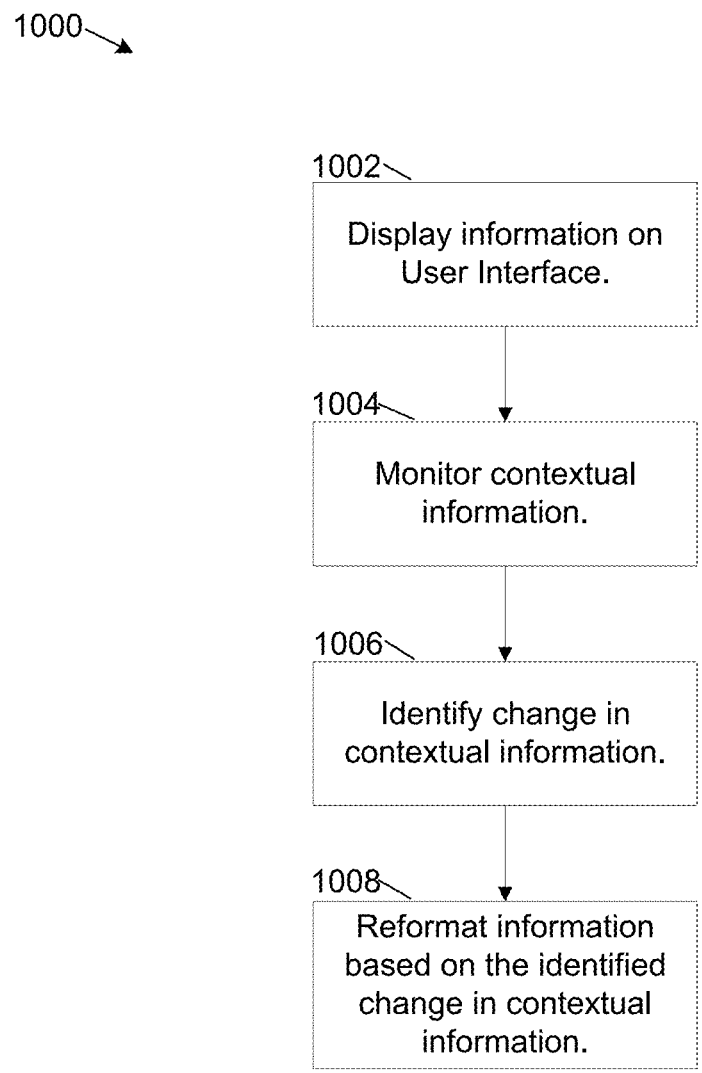
FIG. 10 shows a method for updating the presentation of information performed by embodiments of the information presentation engine of the user computing device of FIG. 1.

Turning now to FIG. 10, a method 1000 for updating the presentation of information is shown. The method 1000 may be performed by some embodiments of the information presentation engine 110.

At operation 1002, information is presented. In some embodiments, the information is displayed on a user interface shown on the user computing device 102. Additionally or alternatively, some or all of the information can be presented as an audio signal. As described previously, the information may be displayed in response to a request from a user or based on a particular application starting on the user computing device 102. The information may be presented in various formats such as in a privacy mode or in a non-privacy mode.

At operation 1004, contextual information is monitored. Monitoring the contextual information may comprise repeatedly evaluating sources of contextual information such as proximity to other devices, environmental light level or images, environmental sound levels, and locations of the user computing device 102. For example, the contextual information may be updated every 30 seconds, every 60 seconds, every 5 minutes, or on other intervals.

At operation 1006, a change in contextual information is identified. For example, if the location of the user computing device 102 changes and the user computing device 102 is no longer proximate to any unknown devices, a change in the contextual information may be identified.

At operation 1008, information is reformatted based on the identified change in contextual information. For example, when the user computing device 102 goes from a being proximate to an unknown device to not being proximate to an unknown device, the presentation of the information can be updated. For example, a user interface may be reformatted so that the sensitive information is expressly displayed rather than being presented qualitatively, obscured, or otherwise hidden in a privacy mode.

Figure 11:
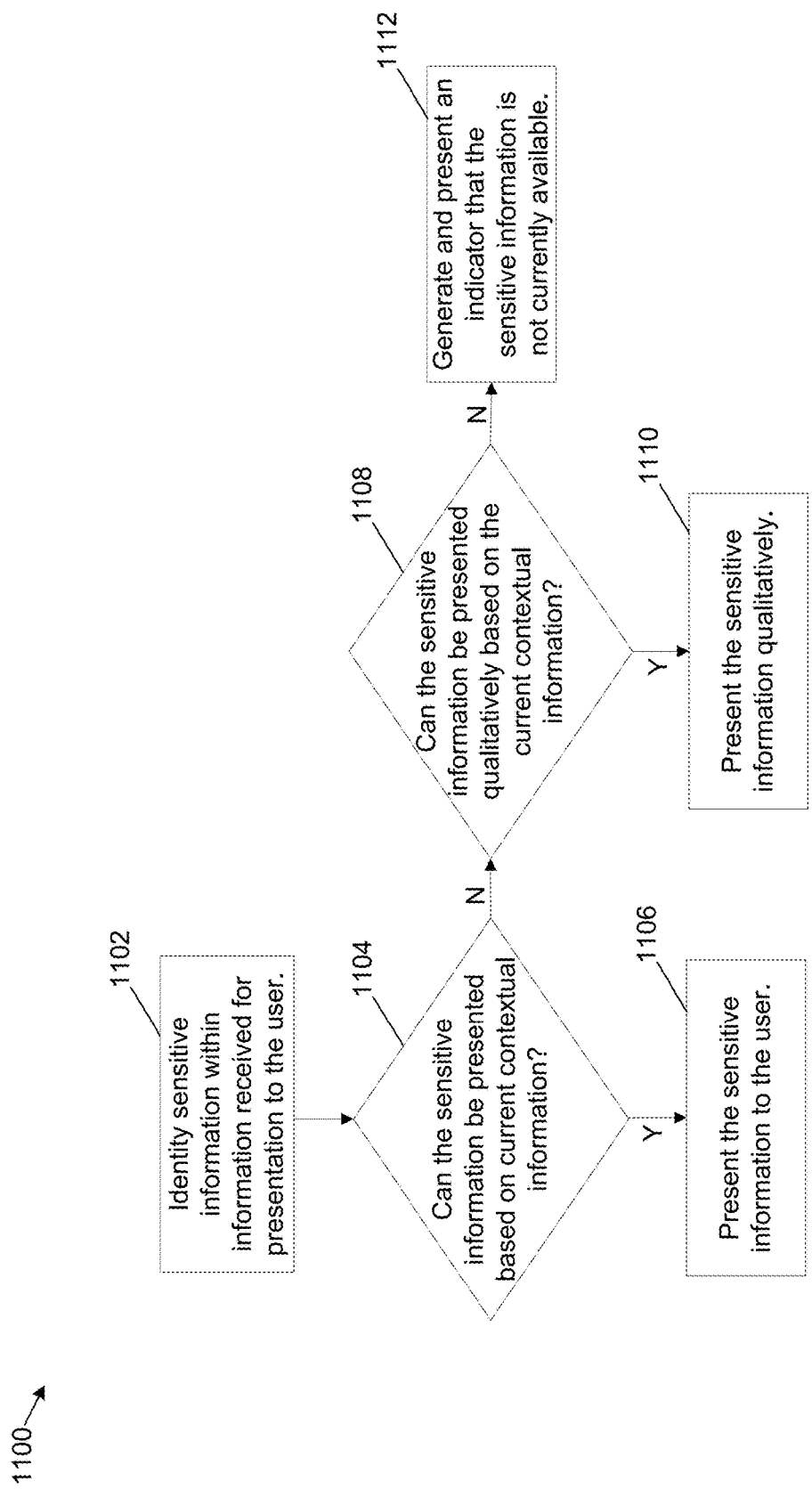
FIG. 11 shows a method of formatting information for presentation based on contextual information performed by embodiments of the information presentation engine of the user computing device of FIG. 1.

Turning now to FIG. 11, a method 1100 of formatting information for presentation based on contextual information is shown. The method 1100 may be performed by the information formatting engine 308 or other components of the information presentation engine 110.

At operation 1102, sensitive information is identified within information that is received for presentation to the user. In some embodiments, the sensitive information is identified based on metadata that accompanies the received information. The metadata can identify certain portions of the information as sensitive or can identify a maximum privacy risk in which the information can be presented. Additionally or alternatively, the sensitive information is identified by analysis of the received information to identify portions that appear to match a sensitive information patter such as numeric values indicating monetary amounts, strings that are formatted as social security numbers, phone numbers, credit card numbers, or address (e-mail or physical), descriptive text that relates to personal health information, test results, etc. For example, the received information can be parsed using regular expression to identify various types of information. In some embodiments, other types of processing are performed to identify sensitive information.

At operation 1104, it is determined whether the sensitive information can be presented based on the current contextual information. If so, the method 1100 continues to operation 1106, where the sensitive information is presented to the user (e.g., the sensitive information can be displayed in clear text on a user interface of the user computing device 102). If not, the method 1100 continues to operation 1108.

At operation 1108 it is determined whether the sensitive information can be presented qualitatively based on the current contextual information. If so, the method 1100 continues to operations 1110 where the sensitive information is presented qualitatively. If not, the method 1100 proceeds to operation 1112 where an indicator is generated and presented that the sensitive information is not currently available. The indicator may be a message that is displayed in a user interface.

Although FIG. 11 describes a method that is performed on, for example, the user computing device 102, in some embodiments, a similar method is performed on the server computer 106. In these embodiments, the server computer 106 device determines how/whether to present sensitive information before transmitting the information to the user computing device. In these embodiments, if the sensitive information cannot be displayed, the server computer 106 may generate and transmit a message to the user computing device 102 that indicates the information is not currently available.

In some embodiments, the message is formatted for display on a user interface within an application running on the user computing device 102. The message can also be formatted for transmission to the user computing device via another messaging technology such as text messaging (SMS), e-mail, or other forms of messaging. The message may include a link (e.g., a universal resource locator (URL)) to more information such as an explanation why the sensitive information is not being provided and how to access the sensitive information (e.g., how the context needs to change to access the sensitive information). Upon receipt of the message, in some embodiments, the user computing device 102 launches an application to display the sensitive information and follow any links included in the message. Non-limiting examples of such applications include messaging and e-mail applications.

Figure 12:
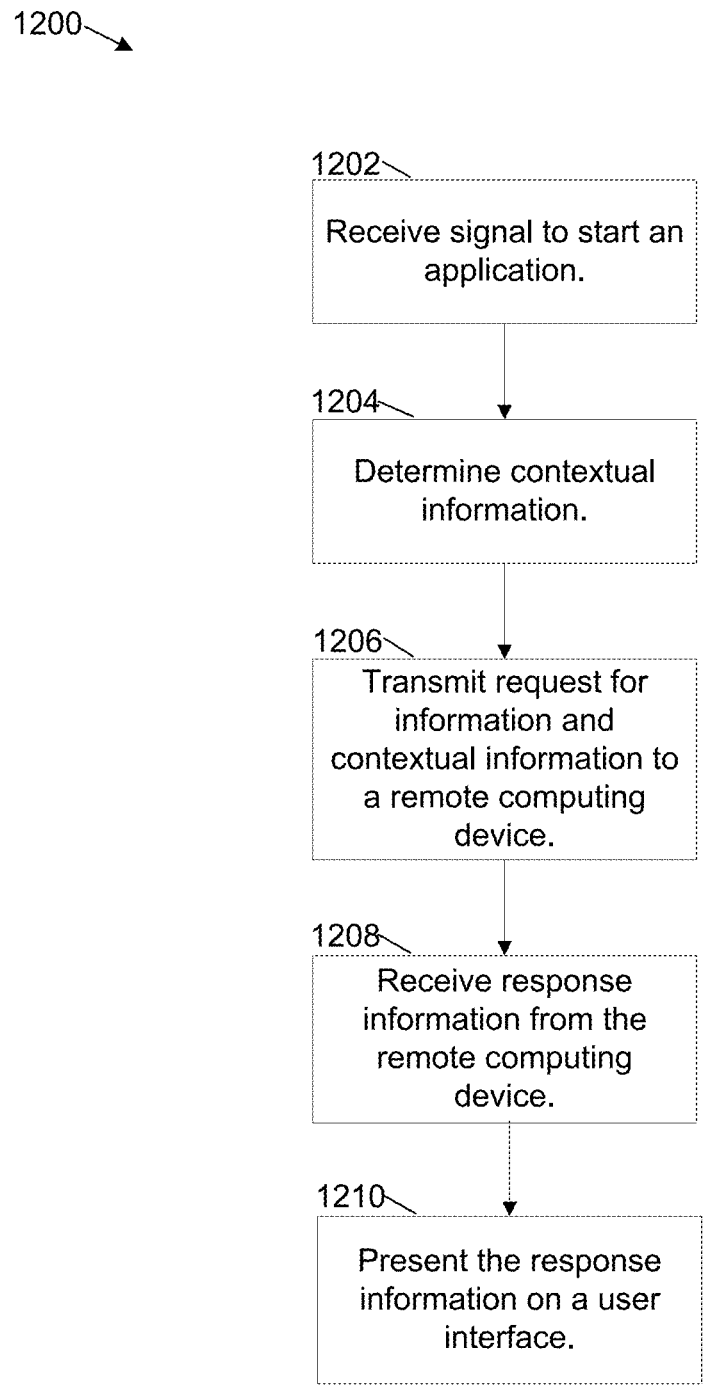
FIG. 12 shows an example method of presenting information performed by embodiments of user computing device of FIG. 1.

FIG. 12 illustrates an example method 1200 of presenting information on a user computing device. This example method 1200 can be used when it is undesirable to even transmit sensitive information to the user computing device 102 based on the current context of the user computing device 102.

At operation 1202, a signal is received to start an application. The application can perform many functions such as personal data management, health or fitness data management, or financial data management.

At operation 1204 context information is determined for the user computing device 102. The context information may be determined according to the techniques previously described above.

At operation 1206, the context information is transmitted to a remote computing device along with a request for information. In some embodiments, the remote computing device such as the server computer 106 uses the contextual information to determine an appropriate format for the information that is returned in response to the request for information.

At operation 1208, a response is received from the remote computing device. The response includes the requested information in a format that is appropriate for presentation based on the contextual information that was transferred to the remote computing device.

At operation 1210, the response information is presented to the user by the user computing device 102. For example, the response information can be presented on a user interface generated on the user computing device 102. Additionally, the response information may be played back using an audio output device such as a speaker or headphones connected to the user computing device 102.

The method 1200 allows the server computer 106 to control the format of potentially sensitive information that is sent to the user computing device 102. In this manner, the sensitive information is protected from potentially nefarious devices that access the data channel being use to transmit data to the user computing device 102.

Figure 13:
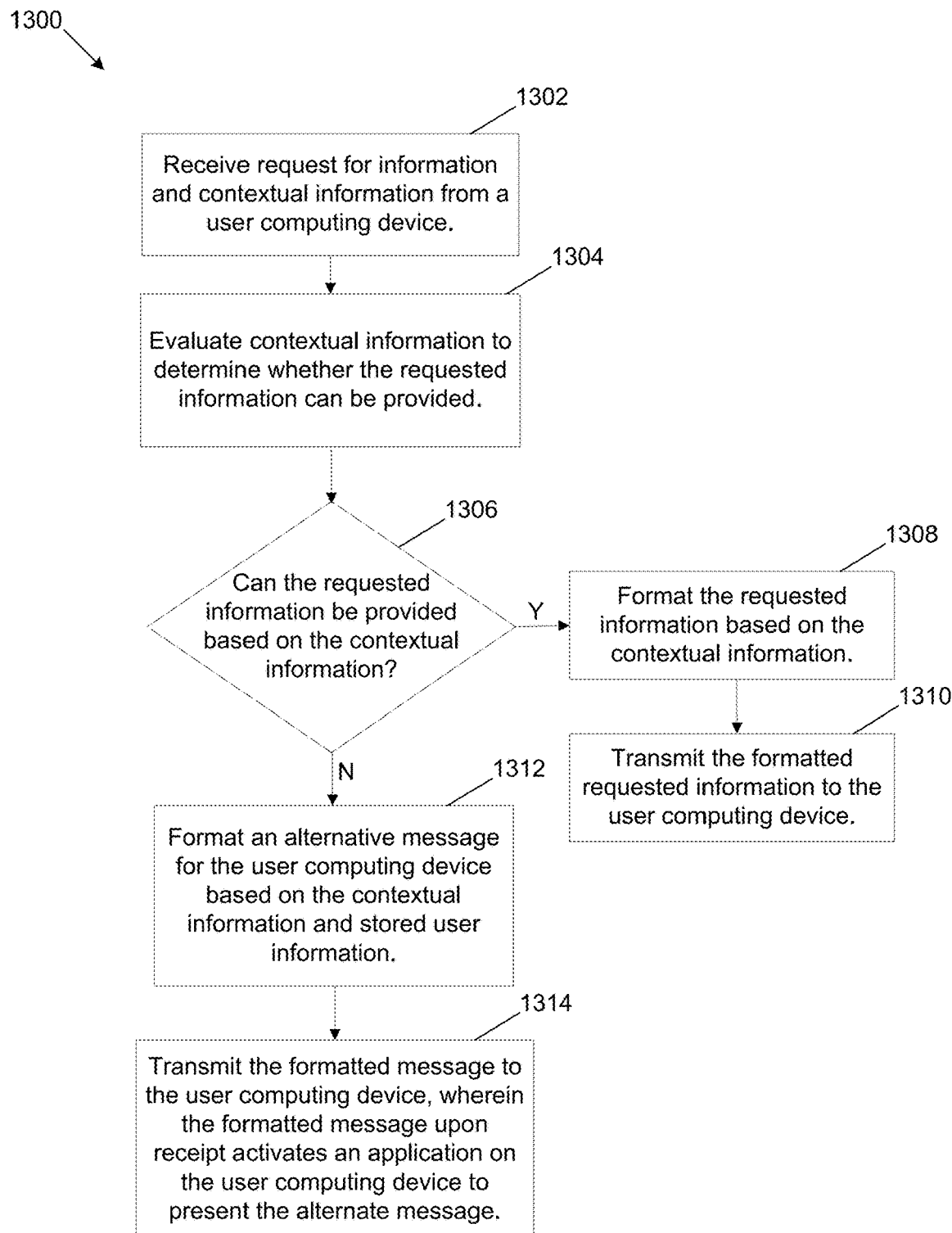
FIG. 13 shows a method of providing information for presentation by a user computing device performed by embodiments of the server computer of FIG. 1.

FIG. 13 illustrates a method 1300 of providing information for presentation by a user computing device. The method 1300 may be performed by embodiments of the server computer 106.

At operation 1302, a request for information is received from a user computing device. The request also includes contextual information from the user computing device.

At operation 1304, the context information is evaluated to determine whether the requested information can be provided to the user computing device. The contextual information may be evaluated according to at least some of the techniques described above.

At operation 1306, it is determined whether the requested information may be provided based on the contextual information. If so, the method 1300 proceeds to operation 1308, where the requested information is formatted based on the contextual information. Techniques for formatting information based on contextual information have been described above. Then, at operation 1310, the formatted information is transmitted to the user computing device.

If instead at operation 1306, it is determined that the requested information cannot be provided based on the contextual information, the method proceeds to operation 1312. At operation 1312, an alternative message for the user computing device is formatted based on the contextual information and stored user information. For example, the information may be formatted as a text message (SMS) based on the network strength signal of the user computing device as indicated in the contextual information. Additionally, stored user information about user preferences may be used to determine an alternative format for the message (e.g., a user may indicate a preference for receiving alternative messages as text messages, e-mails, or over a particular social network, etc.).

At operation 1314, the formatted message is transmitted to the user computing device. In some embodiments, the formatted message is configured so that upon receipt by the user computing device the message will activate an application on the user computing device to present the alternative message. The alternative message may also include a link to further information generated by the server, such as a webpage with information about why the request cannot be completed. When the link is followed on the user computing device, the user computing device will establish a connection with the server computer 106 (or another server) to present the information.

Figure 14:
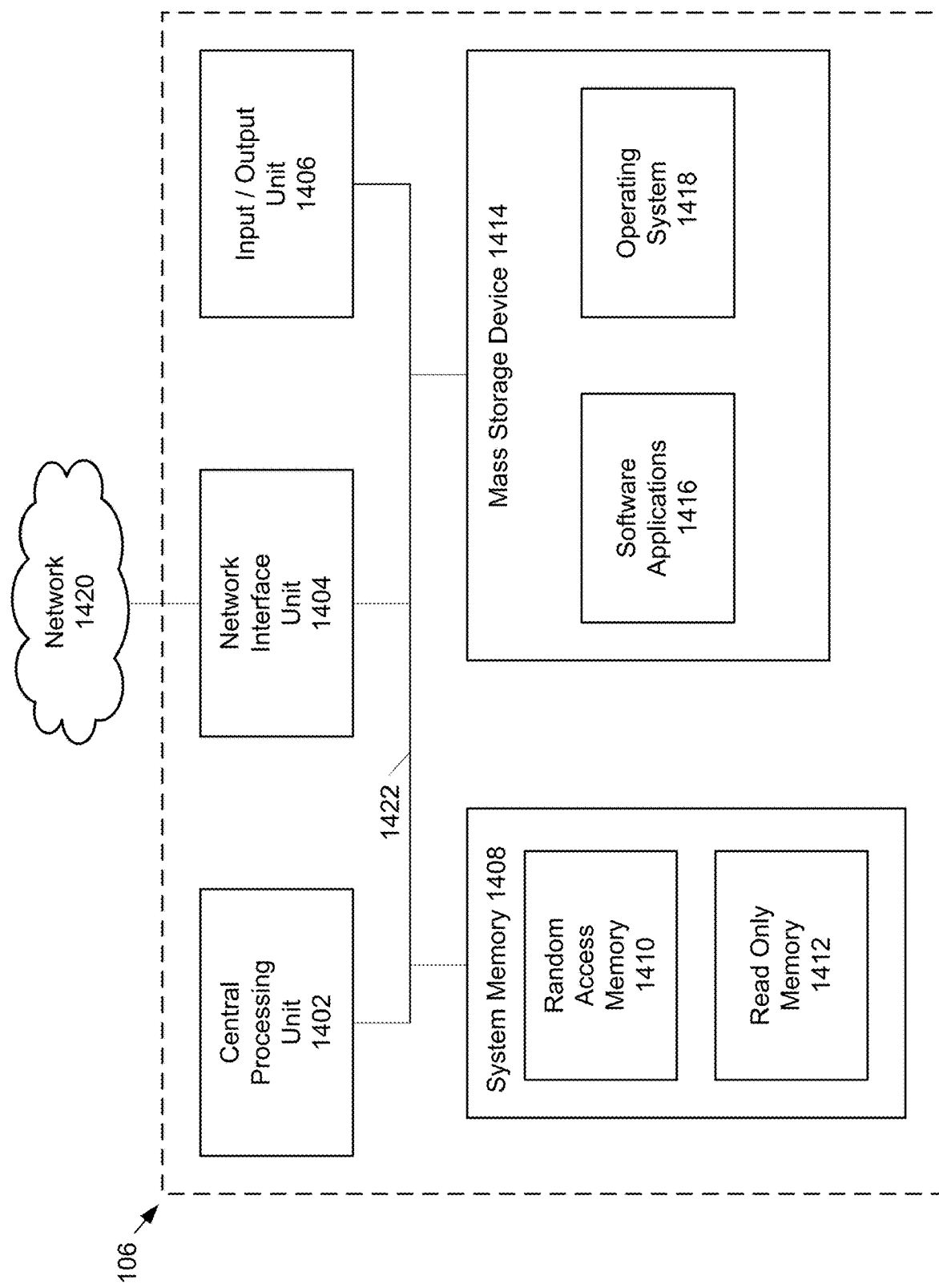
FIG. 14 shows example physical components of the server computer of FIG. 1.

As illustrated in the example of FIG. 14, an example of the server computer 106 includes at least one central processing unit ("CPU") 1402, a system memory 1408, and a system bus 1422 that couples the system memory 1408 to the CPU 1402. The system memory 1408 includes a random access memory ("RAM") 1410 and a read-only memory ("ROM") 1412. A basic input/output system that contains the basic routines that help to transfer information between elements within the server computer 106, such as during startup, is stored in the ROM 1412. The server computer 106 further includes a mass storage device 1414. The mass storage device 1414 is able to store software instructions and data. Some or all of the components of the server computer 106 can also be included in the user computing device 102.

The mass storage device 1414 is connected to the CPU 1402 through a mass storage controller (not shown) connected to the system bus 1422. The mass storage device 1414 and its associated computer-readable data storage media provide non-volatile, non-transitory storage for the server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 106.

According to various embodiments of the invention, the server computer 106 may operate in a networked environment using logical connections to remote network devices through the network 1420, such as a wireless network, the Internet, or another type of network. The server computer 106 may connect to the network 1420 through a network interface unit 1404 connected to the system bus 1422. It should be appreciated that the network interface unit 1404 may also be utilized to connect to other types of networks and remote computing systems. The server computer 106 also includes an input/output controller 1406 for receiving and processing input from a number of other devices, including a touch user interface display screen, or another type of input device. Similarly, the input/output controller 1406 may provide output to a touch user interface display screen or other type of output device.

As mentioned briefly above, the mass storage device 1414 and the RAM 1410 of the server computer 106 can store software instructions and data. The software instructions include an operating system 1418 suitable for controlling the operation of the server computer 106. The mass storage device 1414 and/or the RAM 1410 also store software instructions, that when executed by the CPU 1402, cause the server computer 106 to provide the functionality of the server computer 106 discussed in this document. For example, the mass storage device 1414 and/or the RAM 1410 can store software instructions that, when executed by the CPU 1402, cause the server computer 106 to display received data on the display screen of the server computer 106.

Although FIG. 14 is described with respect to the server computer 106, embodiments of the user computing device 102 can include some or all of the components illustrated in FIG. 14 too.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computing device comprising:
   a processing unit;
   a radio frequency antenna; and
   system memory, the system memory including instructions which, when executed by the processing unit, cause the computing device to:
   determine contextual information associated with the computing device, wherein the contextual information includes proximity information identifying electronic devices in proximity to the computing device;
   determining a risk level for some or all of the identified proximate electronic devices, the risk level for an identified proximate electronic device being based on a type of the identified proximate device;
   determine a privacy context of the computing device based on the contextual information, wherein the privacy context of the computing device is based on a combination of the risk level for the some or all of the identified proximate devices;
   receive information to present to a user of the computing device;
   format the received information based on the privacy context to create formatted information;
   generate a qualitative indicator for sensitive information in the formatted information, the qualitative indicator: (i) replacing the sensitive information; and (ii) providing a positive or negative indication of a value of the sensitive information; and present the formatted information including the qualitative indicator.

2. The computing device of claim 1, wherein the instructions further cause the computing device to monitoring radio frequency communication signals with the radio frequency antenna to identify proximate electronic devices.

3. The computing device of claim 1, wherein the computing device further comprises a location-determining device and wherein the instructions further cause the computing device to:

determine a location of the computing device using the location-determining device;

transmit the determined location to a server computer; and receive a list of proximate computing devices from the server computer.

4. The computing device of claim 1, wherein receiving information to present to a user comprises receiving information from a server computer.

5. The computing device of claim 1, wherein the qualitative indicator is generated by evaluating the sensitive information against a predetermined condition.

6. A computing device comprising:

a processing unit;

a radio frequency antenna;

a location-determining device;

a sound-sensing device;

an optical-sensing device; and system memory, the system memory including instructions which, when executed by the processing unit, cause the computing device to:

capture contextual information using the radio frequency antenna by monitoring radio frequency communication signals to identify proximate devices;

capture contextual information using the location-determining device by determining a location of the computing device;

capture contextual information using at least one of the sound-sensing device and the optical-sensing device;

determine risk levels for the identified proximate devices, the risk levels for the identified proximate devices being based on a type of each of the identified proximate devices;

determine a privacy context using contextual information captured using the radio frequency antenna, the location-determining device, and at least one of the sound-sensing device and the optical-sensing device, the determination of the privacy context of the computing device including determining a risk level for the computing device, the risk level for the computing device being based on a combination of the risk levels for the identified proximate devices;

receive information from a server computer to present to a user of the computing device;

identify sensitive information within the received information;

generate a qualitative indicator for the sensitive information, the qualitative indicator providing a positive or negative indication of a value of the sensitive information;

format the received information based on the privacy context, including replacing the sensitive information using the generated qualitative indicator; and generate a user interface to present the formatted information including the qualitative indicator, wherein the user interface includes a user-actuatable show control that, when actuated, causes the user interface to display the sensitive information.

* * * * *